Nov. 12, 1963
B. R. MILLNER ETAL
3,110,217
SLIDE CHANGER
Filed Aug. 1, 1961
4 Sheets-Sheet 1
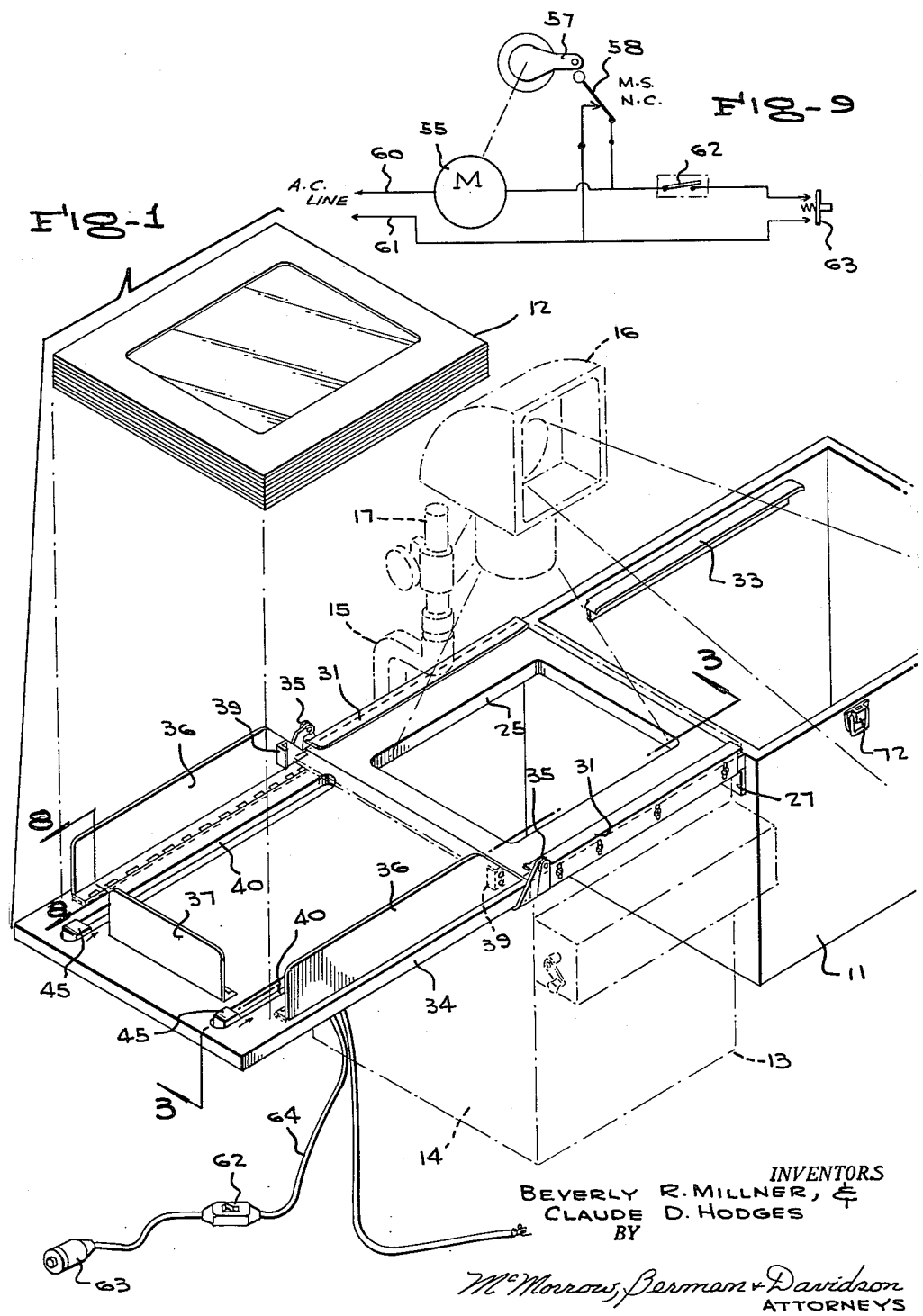
INVENTORS
BEVERLY R. MILLNER, &
CLAUDE D. HODGES
BY
McMorrow, Berman & Davidson
ATTORNEYS

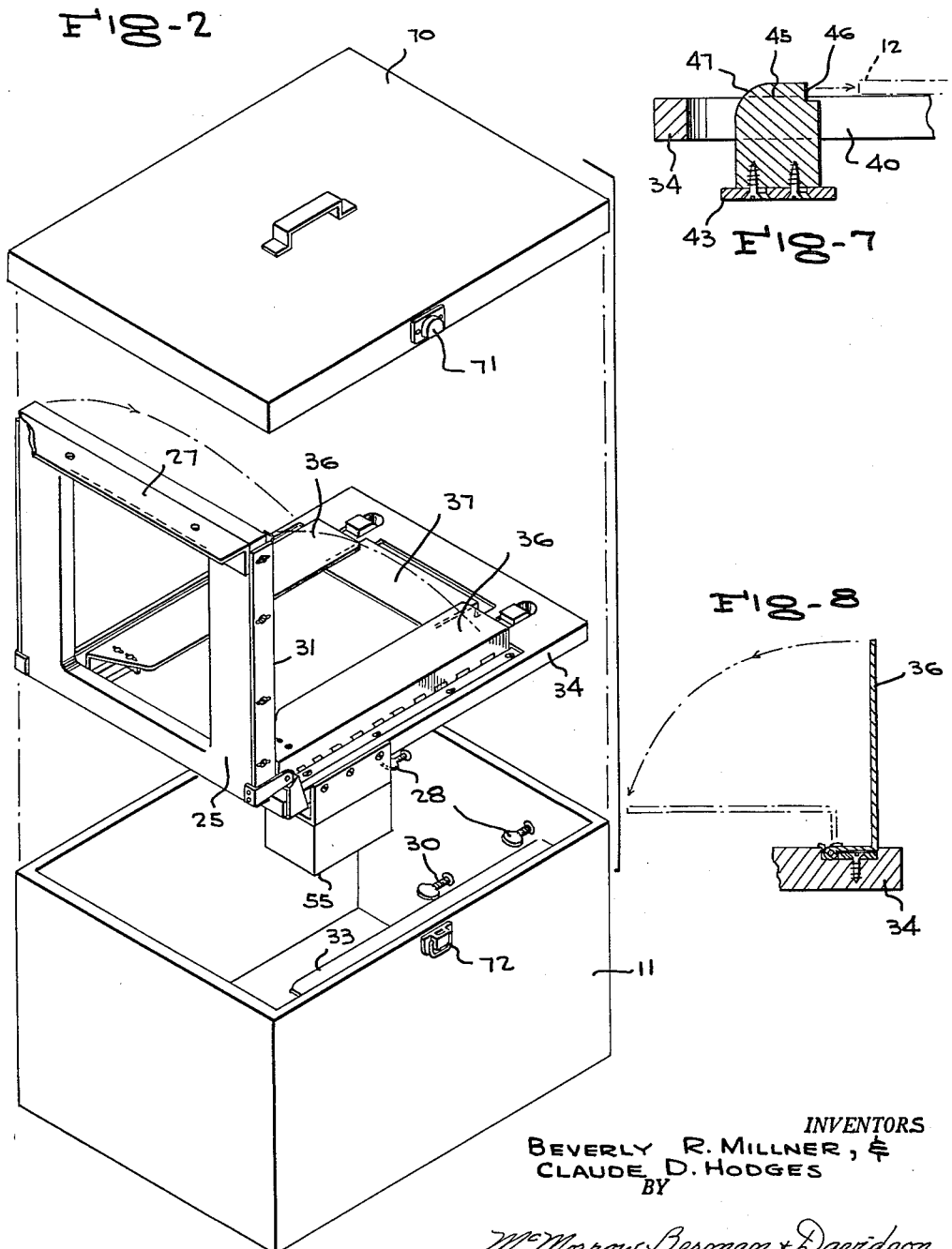

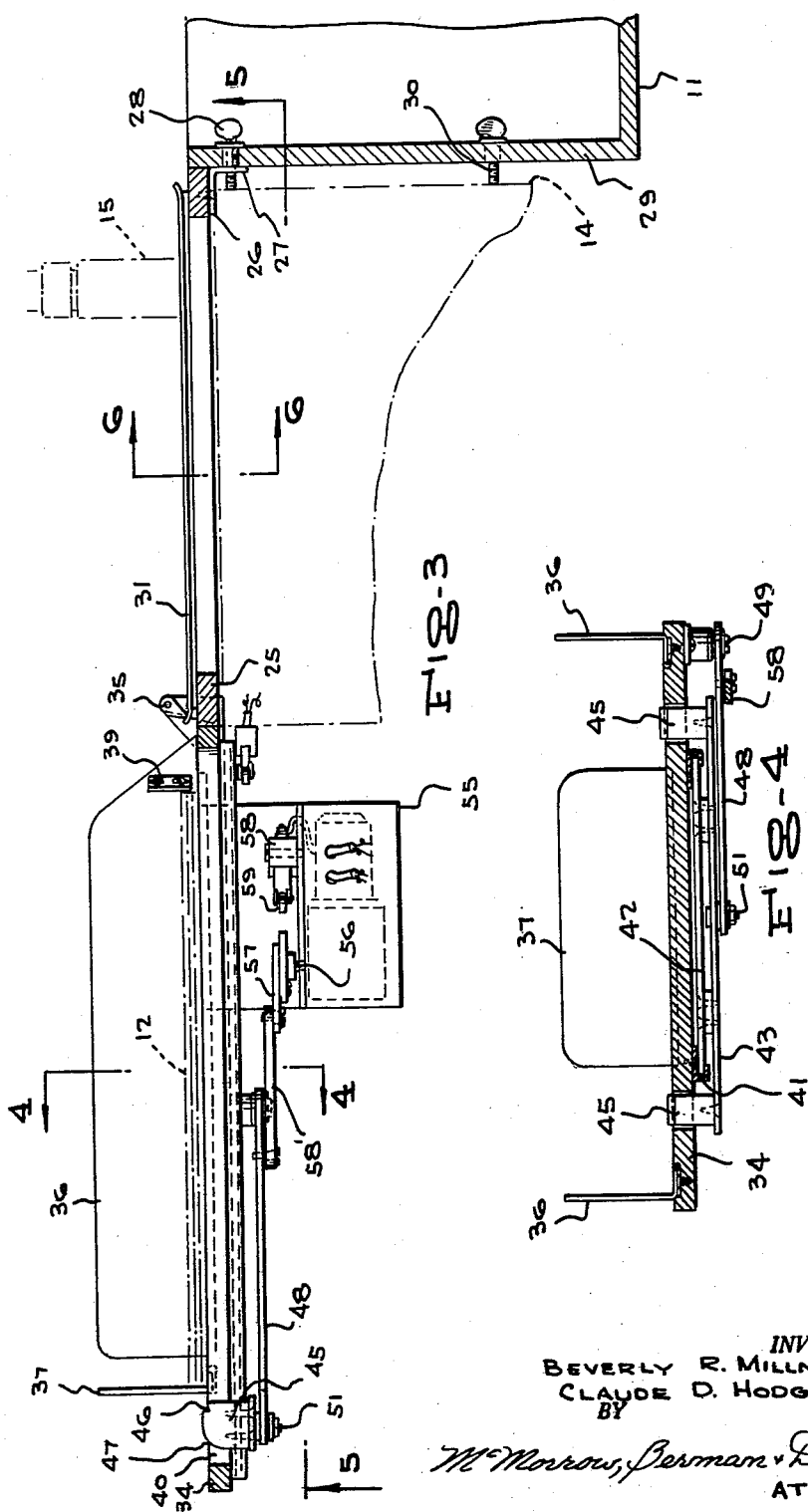

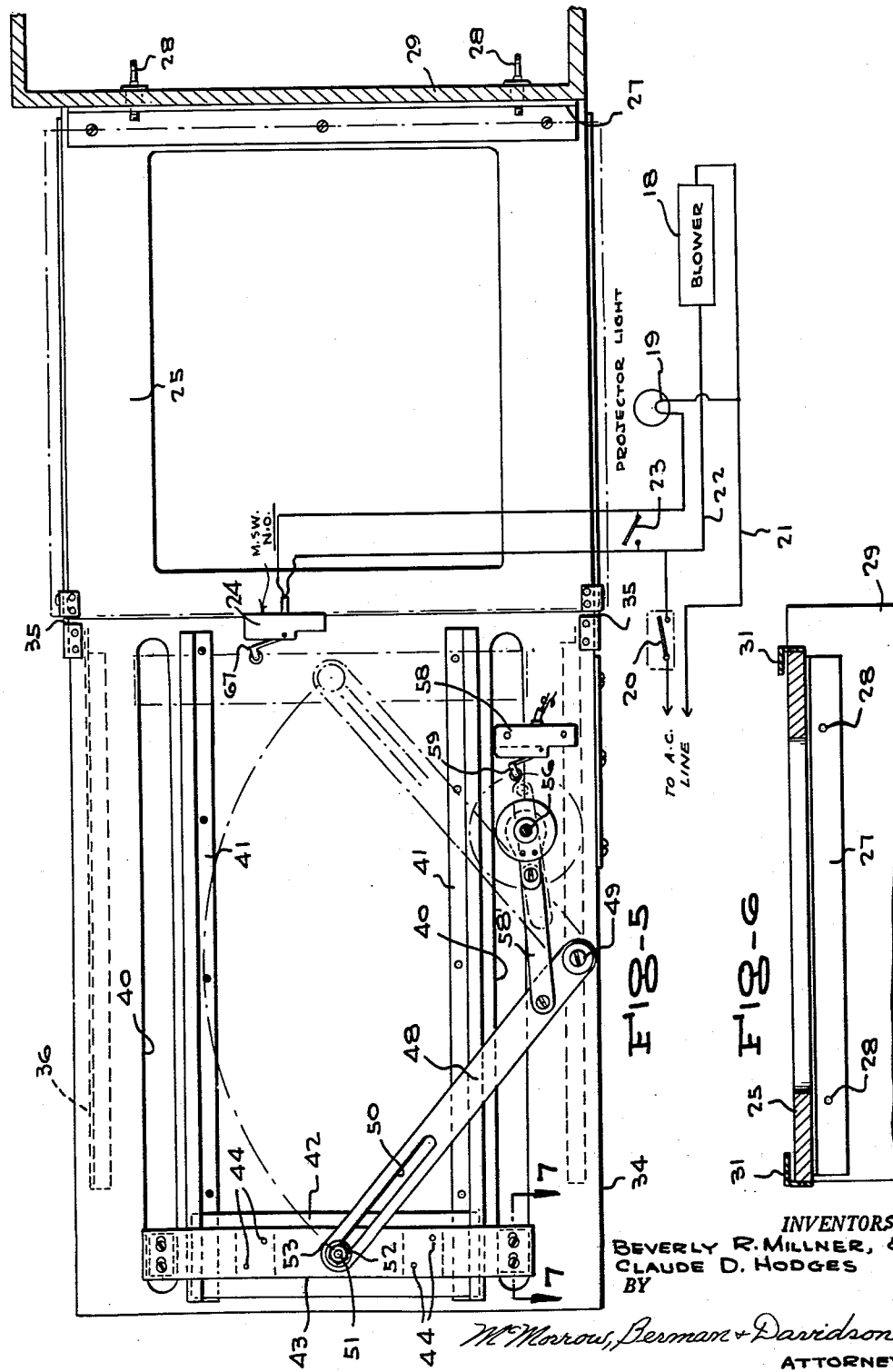

3,110,217
SLIDE CHANGER
Beverly R. Millner, 2730 22nd St., NE., Washington, D.C., and Claude D. Hodges, 6547 27th St., North Arlington, Va.
Filed Aug. 1, 1961, Ser. No. 128,539
4 Claims. (Cl. 88—28)

This invention relates to optical equipment, and more particularly to a slide changer attachment for use with a slide projector.

A main object of the invention is to provide a novel and improved slide changer for use with a slide projector of the type wherein the slide is illuminated from below and the illuminated transparency is projected to a substantially vertical screen, the slide changing attachment being relatively simple in construction, being easy to set up for use, and being collapsible to a compact portable unit for transportation and storage.

A further object of the invention is to provide an improved automatically operated slide changing apparatus for use with slide projection equipment of the type wherein the transparency is illuminated from a light source positioned below same and wherein the illuminated image is projected forwardly by a lens and mirror assembly located above the illuminated transparency, the slide changer involving relatively inexpensive components, being durable in construction, and substantially eliminating any necessity for touching or manually manipulating the slides used therewith after they have been stacked on the magazine plate of the changer.

A still further object of the invention is to provide an improved electrically operated slide changer attachment for use with a slide projection system wherein the slide is positioned horizontally and the light source is located below same, the attachment serving to provide a means for sequentially exhibiting a group of slides in a reliable and convenient manner, the device enabling the slides to be efficiently handled without damage thereto and being arranged so that all of the slides are ultimately collected in a storage receptacle for subsequent future use.

Further objects and advantages of the invention will become apparent from the following description and claims, and from the accompanying drawings, wherein:

FIGURE 1 is a perspective view of an improved slide changer constructed in accordance with the present invention, the slide changer being shown in operative position relative to a projection apparatus, the projection apparatus being shown in dotted view, and further showing a stack of slides adapted to be employed with the changer, the slides being shown separated from the magazine plate of the changer.

FIGURE 2 is a perspective view of the members of the slide changer attachment of FIGURE 1, shown in positions preparatory to folding up the attachment for transportation or storage.

FIGURE 3 is a vertical cross sectional view to an enlarged scale taken substantially on the line 3—3 of FIGURE 1, FIGURE 4 is a transverse vertical cross sectional view taken substantially on the line 4—4 of FIGURE 3.

FIGURE 5 is a horizontal cross sectional view taken substantially on the line 5—5 of FIGURE 3.

FIGURE 6 is a transverse vertical cross sectional view taken substantially on the line 6—6 of FIGURE 3.

FIGURE 7 is an enlarged cross sectional detail view taken on the line 7—7 of FIGURE 5.

FIGURE 8 is an enlarged cross sectional detail view taken substantially on the line 8—8 of FIGURE 1.

FIGURE 9 is an electrical wiring diagram showing the circuit connections of the slide changer attachment illustrated in FIGURES 1 to 8.

Referring to the drawings, 11 generally designates a box-like container which is adapted to house the main parts of the slide changer when not in use, and which is also employed as a support for the main elements of the slide changer when in operation. The container 11 is also employed to receive and store a quantity of generally rectangular, conventional transparencies 12 which are of standard size and shape and which are designed to be used in conjunction with a conventional slide projection apparatus shown in dotted view at 13 in FIGURE 1. This apparatus is of a type which comprises a lamp housing 14, a bracket 15 secured to the housing and rising therefrom, and a projection lens and mirror assembly 16 adjustably mounted on an inwardly offset vertical post element 17 provided on the bracket 15.

As shown in dotted view in FIGURE 1, the projection lens and mirror assembly 16 is adapted to be disposed above a transparency 12 illuminated by the light source in the housing 14 and to collect the light rays therefrom and to project the image defined thereby to a substantially vertical screen located at a suitable horizontal distance in front of the unit. The projection system 13 comprising the housing 14, the bracket 15, and the projection lens and mirror assembly 16 are entirely conventional in themselves and are well known to those skilled in the art.

FIGURE 5 illustrates a typical electrical circuit which is used in the conventional projection apparatus 13, said electrical circuit including a cooling blower 18, the projection lamp 19 and a manually controlled switch 20. As shown, the blower 18 is connected across a pair of supply wires 21 and 22 through the main control switch 20. The projection lamp 19 is connected across the supply wires 21 and 22 through an auxiliary manually controlled switch 23, so that the energization of the lamp 19 may be controlled independently of the energization of the blower 18. A microswitch 24 may be mounted on the upper portion of the housing 14 to be employed in place of the switch 23, which may be left open, the microswitch 24 being connected in parallel with the switch 23, for a purpose presently to be described.

Designated at 25 is a slide positioning frame adapted to be horizontally mounted, and being provided with an angle bracket 26 secured to the bottom of one margin thereof, the bracket 26 having a depending flange 27 which is tapped to receive a pair of thumb screws 28, 28 engaged through the top marginal portion of a side wall 29 of the box-like container 11. Also threaded through the side wall 29 is a positioning screw 30 which is engageable with a side wall of the conventional projector housing 14, along with the ends of the fastening thumb screws 28 so as to properly position the box-like container 11 relative to the projector housing 14. As shown in FIGURE 3, the slide positioning frame 25 is adapted to be engaged on the top rim of the housing 14 so as to support the slide changing attachment in the position illustrated in FIGURE 3.

The slide positioning frame 25 is provided with the inwardly projecting upwardly offset vertically adjustable slide guide flanges 31, 31 at its front and rear edges, said flanges being adapted to guide and properly position a slide 12 over the light-transmitting opening of the frame 25, namely, in the proper position between the light source in the housing 14 and the projection lens and mirror assembly 16 for projection of the image on the slide. The inside surface of one of the longitudinal walls of the container 11 is provided with an inwardly projecting horizontal flange 33 on which one of the longitudinal marginal portions of a slide is receivable when the slide is pushed into a position overlying the container 11, so that the slide will be allowed to drop into the bottom of the container, as will be presently described in the discussion of the operation of the device.

Designated at 34 is a generally rectangular slide magazine plate which is hingedly connected to one of the transverse marginal portions of the slide positioning frame 25 by a pair of hinge bracket assemblies 35, 35, the hinge bracket assemblies 35 having a common transversely extending hinge axis spaced above the plane of the slide positioning frame 25 and located so that when the magazine plate 34 is fully extended its transverse edge abuts the adjacent transverse edge of the slide positioning frame 25 so that the magazine plate 34 is horizontally supported flush with the frame 25, as shown in FIGURE 1. However, the hinges 35 allow the magazine plate 34 to be folded through an angle of 180 degrees to a position parallel to the slide positioning frame 25 for purposes of transportation or storage, particularly, for the placement of the folded members in the box-like container 11.

Hinged to the front and rear longitudinal margins of the magazine plate 34 are respective right angled longitudinal guide brackets 36, 36 which are biased by conventional spring means associated with their hinges toward upstanding positions, as shown in FIGURE 8, being limited to said upstanding positions, but being foldable inwardly to substantially horizontal positions, shown in dotted view in FIGURE 8. A similar, transversely extending hinged guide bracket 37 is provided at the free marginal portion of the magazine plate 34, so that when the brackets 36, 36 and 37 are in their upstanding operative positions, as illustrated in FIGURE 1, they define an enclosure to receive a stack of slide transparencies 12 in the manner illustrated in FIGURE 3, the upstanding flanges of the brackets 36, 36 being substantially aligned with the guide flanges 31, 31.

Respective stop brackets of right angled shape, shown at 39, 39 are vertically secured to the inside surfaces of the end portions of the brackets 36, 36 adjacent the hinges 35, 35, the brackets 39 being located so as to be engageable with the transverse edges of the slide transparencies 12 adjacent the slide positioning frame 25 but being spaced so that the lowermost slide transparency of the stack is free to be moved toward the frame 25 by means presently to be described. Stop brackets 39, 39 are vertically adjustable for slides of different thickness.

As shown in FIGURE 1, the magazine plate 34 is formed with a pair of parallel longitudinal slots 40, 40 spaced inwardly from the right angled guide brackets 36, 36 and extending longitudinally outwardly beyond the transverse hinged bracket 37. Secured to the bottom surface of the magazine plate 34 spaced inwardly from and extending parallel to the slots 40, 40 are respective inwardly facing guide channels 41, 41 which slidably receive the respective ends of a transversely extending supporting plate 42. Designated at 43 is a transversely extending resilient bar member which is secured to the plate 42 at 44, 44, namely, at points spaced substantial distances inwardly from the respective ends of the resilient bar 43 so as to provide relatively flexible free end portions. Secured to the ends of the bar 43 are respective upstanding abutment members 45, 45 which project upwardly through the slots 40, 40 and which are formed with notches 46 engageable with the outer transverse edge of the lowermost slide transparency 12.

As shown in FIGURE 3, the abutment members 45 normally project upwardly through the slots 40 to a height corresponding to the level of the upper surface of the lowermost slide transparency 12 in the stack received on the magazine plate 34, the notch 46 being of a depth corresponding to the thickness of said lowermost transparency so that the abutment members 45, 45 are engageable with the transverse edge of the lowermost transparency when the arm 43 is moved to the right, as viewed in FIGURE 3, to thereby move the lowermost slide transparency toward the slide positioning plate 25, namely, toward a position for projection. The abutment members 45 are provided with rounded corners 47 opposite the notches 46 to facilitate the return movement of the abutment members beneath the stack of transparencies, namely toward the positions of the abutment members illustrated in FIGURE 1.

Designated at 48 is an operating lever which is pivoted at 49 to a longitudinal marginal portion of the magazine plate 34 and which is slidably and pivotally connected to the intermediate portion of the transverse arm 43. Thus, the operating lever 48 is provided with a longitudinal slot 50 which receives a stud 51 depending from the intermediate portion of the arm 43 and which is retained by a washer 52 and a retaining nut 53 so as to provide a pivotal and sliding connection between the lever 48 and the arm 43.

Designated at 55 is an electric motor and gear reduction unit which is secured below the bottom surface of the magazine plate 34 and which is provided with the output shaft 56 having secured thereto a horizontal crank arm 57. Crank arm 57 is connected to the operating lever 48 by a link bar 58', so that the lever 48 is oscillated from the full line position thereof shown in FIGURE 5 to the dotted line position thereof and is returned to the full line position thereof repsonsive to the rotation of the shaft 56. A normally closed microswitch 58 is mounted beneath the magazine plate 34, said microswitch 58 having the operating element 59 which is engageable by the end of the crank arm 57 to open the microswitch when the lever 48 is in the dotted view position thereof shown in FIGURE 5. As shown in FIGURE 9, the motor unit 55 is connected to a pair of supply line conductors 60 and 61 through the microswitch 58. Connected across the microswitch is a branch circuit including a manually controlled switch 62 and a manually operated push button switch 63 incorporated in a line cord 64, as illustrated in FIGURE 1. Thus, with the switch 62 closed, the microswitch 58 may be shunted by closing the push button switch 63. It will be understood that when the crank arm 57 engages the microswitch 58, the energizing circuit for the motor unit 55 is opened and the mechanism stops with the lever arm 48 in the dotted view position thereof shown in FIGURE 5, namely, after a slide has been moved into projection position on the slide positioning frame 25. To move the next slide into this position, it is merely necessary to momentarily close the push button switch 63, which shunts the opened microswitch 58 and operates the mechanism sufficiently to cause the crank arm 57 to release the microswitch and allow it to close, so that the motor unit will be energized to produce a complete cycle of operation of the device even though the push button switch 63 is allowed to open.

As previously mentioned, a microswitch 24 may be provided on the projection apparatus housing 14 in a position near the top rim of the projection housing, namely, at a location so that its operating element 67 is engageable by the transversely extending arm 43 when said arm reaches its innermost position, namely, the dotted view position thereof shown in FIGURE 5. The microswitch 24 is of the normally open type, and is thus closed when engaged by the arm 43. The microswitch 24 is connected across the manually controlled switch 23, as shown in FIGURE 5. Thus, with the switch 23 open, the microswitch 24 will close automatically when a slide has been moved into projection position on the frame 25, energizing the projection lamp 19 at this time. Otherwise, the lamp 19 is maintained deenergized. Therefore, lamp 19 will not be energized during the changing of a slide, namely, during the operating cycle of the mechanism associated with the operating lever 48, but will only become energized when a slide has been moved into the proper position for projection.

In using the attachment, the device is unfolded to the position shown in FIGURE 1, with the slide positioning frame 25 fastened to the wall 29 of housing 11 in the manner above described. The attachment is then placed on the housing 14 of the projection unit 13 and is properly located by abutting the ends of the screws 28 and 30 against a side wall of housing 14. This positions the frame 25 properly with respect to the projection lens and mirror assembly 16. As will be readily understood, the magazine plate 34 is unfolded to a horizontal position flush with the slide positioning frame 25, as shown in FIGURE 1.

The bracket elements 36, 36 and 37 are rotated to their elevated positions shown in FIGURE 1, and a stack of slides 12 are then placed in the enclosure thus defined. If the conductors 61 and 60 are then connected to a suitable source of alternating current power, and if the parts are in the positions shown in FIGURE 1, a slide will be immediately moved into projection position on the frame 25, and the motor unit 55 will become de-energized by the engagement of the crank arm 57 with the operating element 59 of microswitch 58. Also, at this time, if the supply conductors 21 and 22 of the projection unit 13 are connected to the source of electric power and the switch 20 is closed, the blower 18 and the lamp 19 will become energized, since the microswitch 24 will be closed by the engagement of the arm 43 with the operating element 67 of said microswitch 24. To project the next slide it is merely necessary to momentarily close the push button switch 63, which shunts the open microswitch 58 and energizes the motor unit 55 so as to allow the microswitch 58 to close and to complete a cycle of operation of the device, namely, to cause the abutment members 45 to travel outwardly beneath the stack of slides on the magazine plate and to cause the abutment member to return pushing the lowermost slide onto the slide positioning plate 25. Meanwhile, the previous slide is pushed forwardly from the plate 25 to a position overlying the container 11. One longitudinal margin of the slide is engaged by the supporting flange 33, whereas the other longitudinal margin of the slide is unsupported. This causes the slide to tilt and to drop downwardly into the container 11 and ultimately come to rest on the bottom wall of the container. The subsequent slides are likewise caused to drop into the container 11 in the same manner so that the slides will be collected in the container in the exact sequence in which they were arranged in the original stack placed on the magazine plate 34.

After the slides have been all exhibited and use of the attachment is no longer required, the attachment may be folded up and released from the container 11 by unfastening the thumb screws 28, and the folded elements 25 and 34 may be placed in the container 11 along with the slides collected therein. A suitable cover 70 is provided, the cover fitting over the top rim of the container 11 and being provided with conventional locking catches, for example, the conventional catch means comprising the cooperating elements 71 and 72 shown in FIGURE 2, for releasably securing the cover 70 on the container 11.

As shown in FIGURE 2, in folding up the attachment, the hinged bracket member 37 is first rotated to its horizontal position, after which the hinged brackets 36, 36 are rotated inwardly over the ends of the bracket 37. Following this, the slide positioning frame 25 may be rotated to a position overlying the hinged brackets 36, 36 and 37, namely, to a position substantially parallel to the magazine plate 34. Following this the folded assembly may be placed in the container 11 as above described.

The slide changer above described may be also used in conjunction with a tape recorder by suitably interconnecting the tape recorder with the slide changer. Metallic strips can be placed at predetermined intervals along the tape, which will allow the sound to be synchronized with a desired slide. As the metallic strips pass over a suitable electrical contact provided on the tape recorder, a connection is made which may be employed to produce an electrical impulse for actuating the slide changer. In other words, the metallic strips on the tape recorder may be employed to bridge a pair of contacts to define a switch which may be connected in parallel with the push button switch 63, so that the closure of the tape-controlled contacts will operate exactly the same as the manually controlled operation of the push button switch 63. In this way a presentation can be pre-programmed and staged without the necessity of a speaker being present to explain the visual material provided by the slides.

While a specific embodiment of an improved slide changer attachment has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a slide changer of the character described, a support adapted to be disposed adjacent to a projector of the type comprising a light source and a projection lens assembly mounted above said light source, a horizontal slide positioning frame, means to secure said frame to said support in a position to be supported between the light source and the projection lens assembly, a slide magazine plate connected to said frame to be disposed horizontally and laterally thereof and at the same horizontal level, said magazine plate being adapted to receive a stack of slides, upstanding slide positioning stop means on the transverse marginal porton of the magazine plate opposite said support, a pusher member disposed below the magazine plate and projecting a sufficient distance above the magazine plate to engage the lowermost slide, said pusher member being movable longitudinally sufficiently along the magazine plate to push the lowermost slide onto the slide positioning frame into projection position, an electric motor mounted on said magazine plate, a crank arm connected to the motor shaft, an operating lever pivoted to the magazine plate and drivingly engaged with the pusher member, link means operatively connecting said crank arm to said operating lever, a normally closed switch mounted on the magazine plate and being engageable by the crank to be opened thereby when the pusher member has substantially completed the movement of a slide into projection position on the slide positioning frame, and an energizing circuit connected to said motor through said switch, whereby the motor becomes completely de-energized when said pusher member has substantially completed the movement of the slide into said projection position, said crank arm, operating lever and link means extending parallel to said magazine plate and being mounted so as to move parallel to said magazine plate.

2. In a slide changer of the character described, a support adapted to be disposed adjacent to a projector of the type comprising a light source and a projection lens assembly mounted above said light source, a horizontal slide positioning frame, means to secure said frame to said support in a position to be supported between the light source and the projection lens assembly, a slide magazine plate connected to said frame to be disposed horizontally and laterally thereof and at the same horizontal level, said magazine plate being adapted to receive a stack of slides, upstanding slide positioning stop means on the transverse marginal portion of the magazine plate opposite said support, a pusher member disposed below the magazine plate and projecting a sufficient distance above the magazine plate to engage the lowermost slide, said pusher member being movable longitudinally sufficiently along the magazine plate to push the lowermost slide onto the slide positioning frame into projecting position, an electric motor mounted on said magazine plate, a crank arm connected to the motor shaft, an operating lever pivoted to the magazine plate and drivingly engaged with the pusher member, link means operatively connecting said crank arm to said operating lever, a normally closed switch mounted on the magazine plate and being engageable by the crank arm to be opened thereby when the pusher member has substantially completed the movement of a slide into projection position on the slide positioning frame, an energizing circuit connected to said motor through said switch, whereby the motor becomes completely de-energized when said pusher member has substantially completed the movement of the slide into said projection position, and a manually operated normally open switch connected across said first-named switch, said crank arm, operating lever and link means extending parallel to said magazine plate and being mounted so as to move parallel to said magazine plate.

3. In a slide changer of the character described, a support adapted to be disposed adjacent to a projector of the type comprising a light source and a projection lens assembly mounted above said light source, a horizontal slide positioning frame, means to secure said frame to said support in a position to be supported between the light source and the projection lens assembly, a slide magazine plate hinged to one marginal portion of said frame and arranged to be at times disposed horizontally and laterally thereof and at the same horizontal level, said magazine plate being adapted to receive a stack of slides, upstanding slide positioning stop means on the transverse marginal portion of the magazine plate opposite said support, said magazine plate being formed with a longitudinal slot, a pusher member disposed below the magazine plate and projecting a sufficient distance upwardly through said slot to engage the lowermost slide, said pusher member being movable longitudinally sufficiently along the magazine plate to push the lowermost slide onto the slide positioning frame into projection position, upstanding longitudinal guide members on opposite lonigtudinal marginal portions of said magazine plate to guide the slide toward the slide positioning frame, an electric motor mounted on said magazine plate, a crank arm connected to the motor shaft, an operating lever pivoted to the magazine plate and drivingly engaged with the pusher member, link means operatively connecting said crank arm to said operating lever, a normally closed switch mounted on the magazine plate and being engageable by the crank arm to be opened thereby when the pusher member has substantially completed the movement of a slide into projection position on the slide positioning frame, an energizing circuit connected to said motor through said switch, whereby the motor becomes completely de-energized when said pusher member has substantially completed the movement of the slide into said projection position, and a manually operated normally open switch connected across said first-named switch, said crank arm, operating lever and link means extending parallel to said magazine plate and being mounted so as to move parallel to said magazine plate.

4. In a slide changer of the character described, a box-like container open at its top adapted to be disposed adjacent to a projetcor of the type comprising a light source and a projection lens assembly mounted above said light source, a horizontal slide positioning frame, means to secure said frame to the top marginal portion of one side wall of said container in a position to be supported between the light source and the projection lens assembly, a slide magazine plate hinged to one marginal portion of said frame and arranged to be at times disposed horizontally and laterally thereof and at the same horizontal level, said magazine plate being adapted to receive a stack of slides, upstanding slide positioning stop means on the transverse marginal portion of the magazine plate opposite said support, said magazine plate being formed with a longitudinal slot, a pusher member disposed below the magazine plate and projecting a sufficient distance upwardly through said slot to engage the lowermost slide, said pusher member being movable longitudinally sufficiently along the magazine plate to push the lowermost slide onto the slide positioning frame into projection position, upstanding longitudinal guide members on opposite longitudinal marginal portions of said magazine plate to guide the slide toward the slide positioning frame, an electric motor mounted on said magazine plate, a crank arm connected to the motor shaft, an operating lever pivoted to the magazine plate and drivingly engaged with the pusher member, link means operatively connecting said crank arm to said operating lever, a normally closed switch mounted on the magazine plate and being engageable by the crank arm to be opened thereby when the pusher member has substantially completed the movement of a slide into projection position on the slide positioning frame, an energizing circuit connected to said motor through said switch, whereby the motor becomes completely de-energized when said pusher member has substantially completed the movement of the slide into said projection position, and a manually operated normally open switch connected across said first-named switch, said crank arm, operating lever and link means extending parallel to said magazine plate and being mounted so as to move parallel to said magazine plate.

References Cited in the file of this patent

UNITED STATES PATENTS

| | | |
|---|---|---|
| 2,363,820 | Warriner | Nov. 28, 1944 |
| 2,795,169 | Wottring | June 11, 1957 |
| 3,003,394 | Figaretti | Oct. 10, 1961 |